United States Patent
Takegami

(10) Patent No.: US 11,011,993 B2
(45) Date of Patent: May 18, 2021

(54) POWER SUPPLY AND MEDICAL SYSTEM

(71) Applicant: TDK CORPORATION, Tokyo (JP)

(72) Inventor: Eiji Takegami, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/822,669

(22) Filed: Mar. 18, 2020

(65) Prior Publication Data

US 2020/0313559 A1 Oct. 1, 2020

(30) Foreign Application Priority Data

Mar. 25, 2019 (JP) .............................. JP2019-055905

(51) Int. Cl.
*H02M 3/24* (2006.01)
(52) U.S. Cl.
CPC ..................................... *H02M 3/24* (2013.01)
(58) Field of Classification Search
None
See application file for complete search history.

(56) References Cited

U.S. PATENT DOCUMENTS

| | | | | |
|---|---|---|---|---|
| 6,144,194 A * | 11/2000 | Varga | ................. | H02M 3/1584 323/285 |
| 6,381,157 B2 * | 4/2002 | Jensen | ................. | H02M 3/1584 363/65 |
| 8,552,704 B2 * | 10/2013 | Kiadeh | ............... | H02M 3/1584 323/285 |
| 9,960,676 B1 * | 5/2018 | Symonds | .............. | H02M 3/285 |

OTHER PUBLICATIONS

"RKE Series Single phase input / single output 1500W", TDK-Lambda, https://www.us.tdk-lambda.com/ftp/Specs/rke.pdf.

* cited by examiner

*Primary Examiner* — Jeffery S Zweizig
(74) *Attorney, Agent, or Firm* — Greenblum & Bernstein, P.L.C.

(57) ABSTRACT

A power supply can be driven in parallel in a master-slave arrangement using fewer wires. Each power supply includes: input terminals; output terminals; a master terminal; a slave terminal; a switching power supply that switches an inputted voltage and executes one of a constant-voltage operation that outputs a DC voltage of a target voltage value and a constant-current operation that outputs a DC current of a target current value; an indicative voltage generator that generates a current detection signal indicating the current outputted from the output terminals, superimposes a bias voltage (>a threshold voltage), and outputs to the master terminal; and an operation switcher that compares a voltage applied to the slave terminal and the threshold voltage and outputs, based on the result, a control signal for switching to the constant-voltage operation or the constant-current operation, to the switching power supply.

8 Claims, 6 Drawing Sheets

F I G. 4
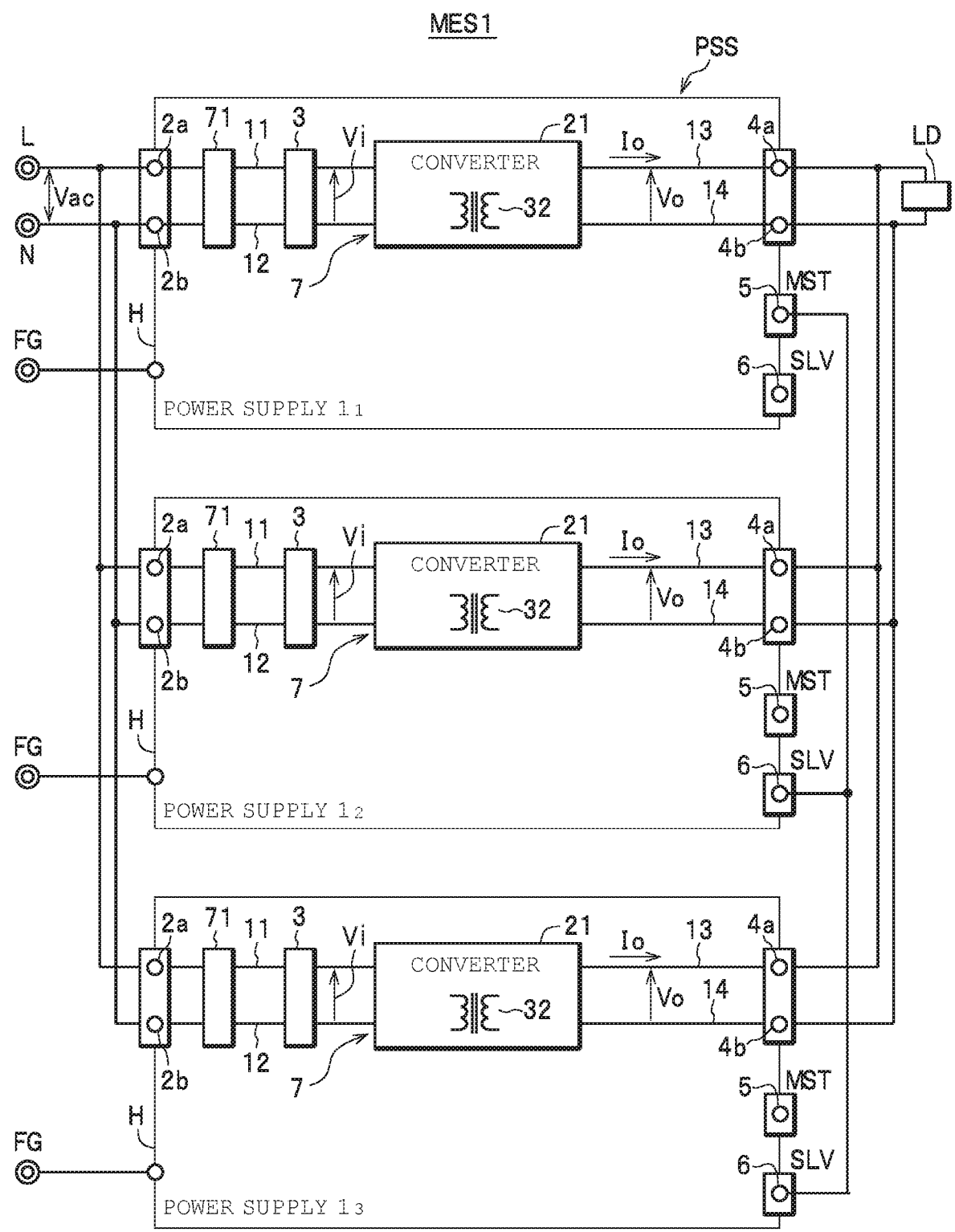

POWER SUPPLY AND MEDICAL SYSTEM

FIELD OF THE INVENTION

The present invention relates to a power supply capable of operating in a master-slave arrangement when used in numbers, and to a medical system equipped with this power supply.

DESCRIPTION OF THE RELATED ART

As one example of this type of power supply, a power supply that has already been developed by the present applicant is known (see "RKE SERIES" introduced on the homepage of TDK Lambda Co., Ltd. at the Internet URL (found on Mar. 7, 2019) "https://product.tdk.com/info/ja/catalog/datasheets/rke_j.pdf"). As depicted in FIG. 7, this power supply is equipped with alternating current (AC) input terminals (these AC input terminals are not depicted), a + direct current (DC) output terminal, a −DC output terminal, a common signal terminal −COM, a reference output voltage terminal REF, a variable output voltage terminal RV, and a current balance terminal CB. As a configuration where + and − DC output terminals of a plurality of these power supplies are connected to a common load and driven to operate in parallel, it becomes possible to select one of a configuration (or "first configuration") capable of equalizing the output current of each power supply by connecting the respective current balance terminals CB and the respective common signal terminals −COM of the power supplies together, and a configuration (or "second configuration" or so-called "master-slave parallel driving") where, in addition to the connections in the first configuration, the reference output voltage terminal REF of one power supply selected as a master out of the power supplies is connected to the variable output voltage terminals RV of all of the power supplies (including the master) so that the output voltage of other power supplies (or "slaves") can be made to follow the output voltage of the master by merely changing the output voltage of the master while equalizing the output currents of the respective power supplies.

SUMMARY OF THE INVENTION

However, when a plurality of the power supplies described above are driven in parallel in a master-slave arrangement to supply power to a single load, as described above it is necessary to connect the respective current balance terminals CB together and the respective common signal terminals −COM of the power supplies together, and to also connect the reference output voltage terminal REF of the power supply as the master to the variable output voltage terminals RV of all the power supplies. Since the number of wires is large, there is the problem to be solved of the burden of wiring the power supplies together.

The present invention was conceived in view of the problem described above and has a principal object of providing a power supply that enables a plurality of power supplies to be driven in parallel in a master-slave arrangement with fewer wires and a medical system equipped with this power supply.

To achieve the stated object, a power supply according to the present invention comprises: a pair of input terminals into which an input voltage is inputted; a pair of output terminals; a master terminal; a slave terminal; a switching power supply that includes a switch that switches a direct current (DC) input voltage, which has been generated based on the input voltage, and is configured to switch between and execute a constant-voltage operation that generates a DC voltage of a set target voltage value base on the input voltage and outputs to the output terminals and a constant-current operation that generates a DC current of a set target current value based on the input voltage and outputs to the output terminals; an indicative voltage generator that generates a current indicating voltage whose voltage value changes in proportion to a current value of a current outputted from the switching power supply to a periphery via the output terminals, superimposes a bias voltage with a predetermined voltage value, which exceeds a predetermined voltage threshold value, onto the current indicating voltage, and outputs from the master terminal to the periphery as an operation indicating voltage; and an operation switcher that compares an applied voltage value of an applied voltage, which is applied from the periphery to the slave terminal, and the threshold voltage value, outputs a control signal for switching to the constant-voltage operation to the switching power supply when the applied voltage value is below the threshold voltage value, and outputs a control signal for switching to the constant-current operation, which sets a current value in proportion to a difference in voltage value between the applied voltage value and the bias voltage as the set target current value, to the switching power supply when the applied voltage value is above the threshold voltage value.

In this way, with this power supply, it is possible to connect a plurality of power supplies in a master-slave arrangement to construct a power supply system. As the connecting tasks (wiring tasks) when power is to be supplied (outputted) to a common load, it is sufficient, as connection tasks aside from a task of connecting the input terminals of the power supplies to an input line and a task of connecting the output terminals of the power supplies to the load (that is, as connection tasks required to produce the master-slave arrangement), to merely perform a task of connecting the master terminal of the power supply set as the master to the slave terminals of the remaining power supplies with wires. Therefore, it is possible to complete the connecting tasks to produce the master-slave arrangement with fewer wires.

In the power supply according to the present invention, in an execution state of the constant-current operation, the switching power supply calculates a control variable by applying a control variable, which reflects fluctuations in a voltage of the output terminals, to a control variable that reflects a difference between a present current value of the DC current and the set target current value, and controls an on-duty of the switch based on the calculated control variable.

Accordingly, with the power supply described above, when the power supply is operating as a slave, the switching power supply is capable of starting an operation based on a control variable that reflects fluctuations in the voltage of the output terminals (that is, an operation that increases or decreases the current value of the DC current of that power supply in keeping with the fluctuations in the present voltage value of the DC voltage of that power supply) ahead of an operation based on a control variable that reflects a difference between the present current value of the DC current and the set target current value (an operation that increases or decreases the current value of the DC current of that power supply in concert with a master power supply). By doing so, even when the present voltage value of the DC output voltage has suddenly fluctuated, a power supply that operates as a slave is capable of increasing and decreasing the current value of the DC current outputted from that power supply so as to favorably follow the sudden fluctuations, which means that the plurality of power supplies connected in the master-slave arrangement are capable as a whole of restoring the present voltage value of the DC voltage to the target voltage value in a short time and maintaining the set target voltage value thereafter.

A medical system according to the present invention comprises: a plurality of one of the power supplies described above that each further include: a primary-side rectifier/smoother that is connected via a pair of power supply lines to the pair of input terminals and rectifies and smoothes an alternating current (AC) input voltage, which is inputted as the input voltage via the pair of input terminals and the pair of power supply lines, from an input line connected to the pair of input terminals, and outputs as the DC input voltage to the switching power supply; and a fuse or a breaker interposed on the pair of power supply lines, and are each configured with the switching power supply as an isolation converter that includes an isolation transformer, wherein the output terminals of the plurality of power supplies are connected in parallel and one power supply out of the plurality of power supplies as set as a master power supply and the master terminal of the master power supply is connected to the slave terminals of every remaining power supply; and a medical appliance that is connected to the output terminals that are connected in parallel and operates based on the DC voltage from the power supplies.

Accordingly, with the medical system described above, by using a configuration in which each power supply includes an isolation transformer with reinforced insulation and that further includes a fuse or a breaker on the pair of power supply lines, it is possible to meet medical standards in units of the power supplies alone. This means that it is possible to realize a configuration that is capable of achieving medical standards without interposing an isolation transformer or a fuse (or a breaker) outside each power supply (in more detail, on the input line connected to each power supply). Also, according to the medical system, by including the power supplies, it is possible to achieve the same effects as when the power supply system is constructed by connecting the plurality of power supplies described above in the master-slave arrangement.

A medical system according to the present invention comprises: a plurality of one of the power supplies described above that each further include a primary-side rectifier/smoother that is connected via a pair of power supply lines to the pair of input terminals and rectifies and smoothes an AC input voltage, which is inputted as the input voltage via the pair of input terminals and the pair of power supply lines, from an input line connected to the pair of input terminals, and outputs as the DC input voltage to the switching power supply, and are each configured with the switching power supply as an isolation converter that includes an isolation transformer, wherein the output terminals of the pluralit of power supplies are connected in parallel and one power supply out of the plurality of power supplies is set as a master power supply and the master terminal of the master power supply is connected to the slave terminals of every remaining power supply; a fuse or a breaker interposed on the input line; and a medical appliance that is connected to the output terminals that are connected in parallel and operates based on the DC voltage from the power supplies.

According to the medical system, where each power supply includes the isolation transformer that has reinforced insulation, it is possible to realize a configuration capable of meeting medical standards by merely interposing the fuse (or the breaker) outside each power supply (in more detail, on the input lines (the L-phase line and N-phase line) connected to each power supply). Also, according to the medical system, by including the power supplies, it is possible to achieve the same effects as when the power supply system is constructed by connecting the plurality of power supplies described above in the master-slave arrangement.

A medical system according to the present invention comprises: a plurality of one of the power supplies described above that each further include: a primary-side rectifier/smoother that is connected via a pair of power supply lines to the pair of input terminals and rectifies and smoothes an AC input voltage, which is inputted as the input voltage via the pair of input terminals and the pair of power supply lines, from an input line connected to the pair of input terminals, and outputs as the DC input voltage to the switching power supply; and a first fuse or a first breaker interposed on one power supply line out of the pair of power supply lines, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply; a second fuse or a second breaker interposed on the input line connected via the input terminal to another power supply line out of the pair of power supply lines; and a medical appliance that is connected to the output terminal s that are connected in parallel and operates based on the DC voltage from the power supplies.

According to the medical system, where each power supply includes the isolation transformer that has reinforced insulation, since each power supply internally further includes the first fuse or the first breaker interposed on one power supply line, by merely interposing the second fuse (or the second breaker) outside each power supply (in more detail, on the input line connected to the other power supply line out of the input lines connected to each power supply), it is possible to realize a configuration capable of meeting medical standards. Also, according to the medical system, by including the power supplies described above, it is possible to achieve the same effects as when the power supply system is constructed by connecting the plurality of power supplies described above in the master-slave arrangement.

In this way, according to the present invention, it is possible to connect a plurality of power supplies in a master-slave arrangement to construct a power supply system. As the connecting tasks required to produce the master-slave arrangement out of the connecting tasks (wiring tasks) when power is to be supplied (outputted) to a common load, it is sufficient to merely perform a task of connecting the master terminal of the power supply set as the master to the slave terminals of the remaining power supplies with wires. Therefore, it is possible to complete the connecting tasks to produce the master-slave arrangement with fewer wires.

It should be noted that the disclosure of the present invention relates to the contents of Japanese Patent Application No. 2019-055905 that was filed on Mar. 25, 2019, the entire contents of which are herein incorporated by reference.

BRIEF DESCRIPTION OF THE DRAWINGS

These and other objects and features of the present invention will be explained in more detail below with reference to the attached drawings, wherein:

FIG. 4 is a diagram of a medical system equipped with a power supply system composed of three power supplies;

DESCRIPTION OF THE PREFERRED EMBODIMENTS

Preferred embodiments of a power supply and a medical system will now be described with reference to the attached drawings.

Figure 1:
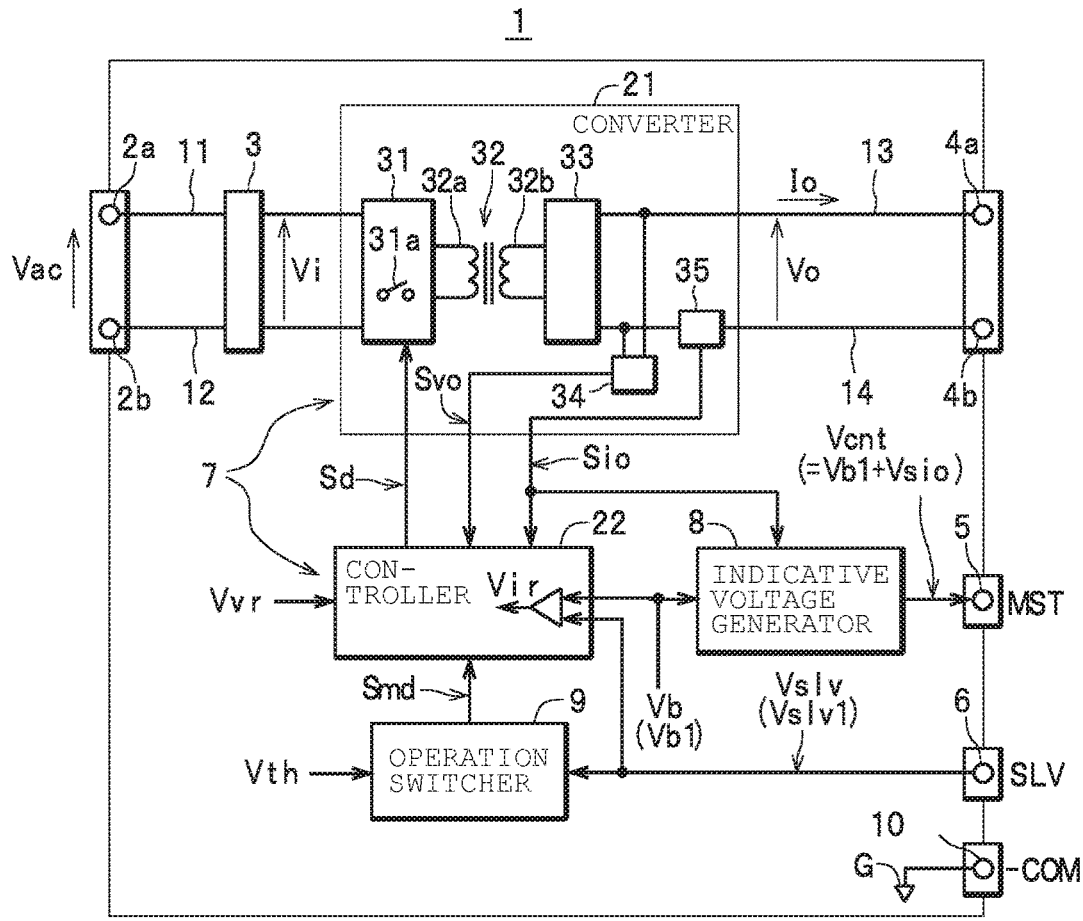
FIG. 1 is a diagram depicting the configuration of a power supply.

First, the configuration of a power supply 1 as an example of a power supply according to the present invention will be described with reference to FIG. 1. As one example, the power supply 1 includes a pair of input terminals 2a and 2b, a primary-side rectifier/smoother 3, a pair of output terminals 4a and 4b, a master terminal 5 (indicated as "MST" in the drawing), a slave terminal 6 (indicated as "SLV" in the drawing), a switching power supply 7, an indicative voltage generator 8, and an operation switcher 9. The power supply 1 also includes a common signal terminal 10 (indicated as "−COM" in FIG. 1) connected to a part (the ground G for the indicative voltage generator 8, the operation switcher 9, and the like) that is a reference potential for an operation indicating voltage vent, described later, outputted from the master terminal 5 and an applied voltage Vslv, described later, applied to the slave terminal 6.

The pair of input terminals 2a and 2b are connected to an input line (not illustrated) outside the power supply 1. An AC input voltage Vac is inputted into this pair of input terminals 2a and 2b as an input voltage that is being supplied to the input line. The primary-side rectifier/smoother 3 is connected to the pair of input terminals 2a and 2b via a pair of power supply lines 11 and 12, rectifies and smoothes the AC input voltage Vac inputted via the pair of input terminals 2a and 2b and the pair of power supply lines 11 and 12, and outputs a DC input voltage Vi.

The switching power supply 7 includes, as one example, a converter 21 and a controller 22. In more detail, the converter 21 includes, as one example, a switch 31 with one or two or more switching elements (switches) 31a, an isolation transformer 32 with a primary winding 32a and a secondary winding 32b, and a secondary-side rectifier/smoother 33 and is configured as an isolation converter.

Although not illustrated, the switch 31 is configured using any known circuit configuration, such as a single-ended forward configuration, a push-pull configuration, a half-bridge configuration, and a full-bridge configuration, and includes an appropriate number of switching elements 31a for the selected circuit configuration. Due to the switching elements 31a being driven by a drive signal Sd outputted from the controller 22, the switch 31 intermittently applies the DC input voltage Vi to the primary winding 32a of the isolation transformer 32 (in more detail, by performing on-off operations with an on-duty set by the pulse width of the drive signal Sd).

The isolation transformer 32 generates an induced voltage in the secondary winding 32b when the DC input voltage Vi is intermittently applied by the switch 31 to the primary winding 32a. The secondary-side rectifier/smoother 33 rectifies and smoothes the induced voltage to convert to a DC voltage (DC output voltage) Vo, and outputs the voltage across the pair of output terminals 4a and 4b via a pair of output lines 13 and 14.

The converter 21 includes a voltage detector 34 that detects the DC output voltage Vo and outputs a voltage detection signal Svo whose voltage value changes in proportion to the voltage value of the DC output voltage Vo and a current detector 35 that detects an output current (DC current) Io flowing on the pair of output lines 13 and 14 and outputs a current detection signal Sio whose voltage value changes in proportion to the current value of the DC current Io.

The controller 22 generates and outputs the drive signal Sd for the switch 31 for controlling the on-duty of the switching elements 31a, based on the voltage detection signal Svo and the current detection signal Sio outputted from the converter 21, a reference voltage Vvr indicating a target voltage value Vtg for the DC output voltage Vo, a reference voltage Vir indicating a target current value Itg for the DC current Io, and a control signal Smd (a signal indicating constant-voltage operation or constant-current operation) outputted from the operation switcher 9. The reference voltage Vir is calculated by the controller 22 subtracting a bias voltage Vb (with a voltage value Vb1), described later, from an applied voltage Vslv (with a voltage value Vslv1) applied from the periphery to the slave terminal 6 as described later, and has a voltage value of (Vslv1−Vb1).

Figure 2:
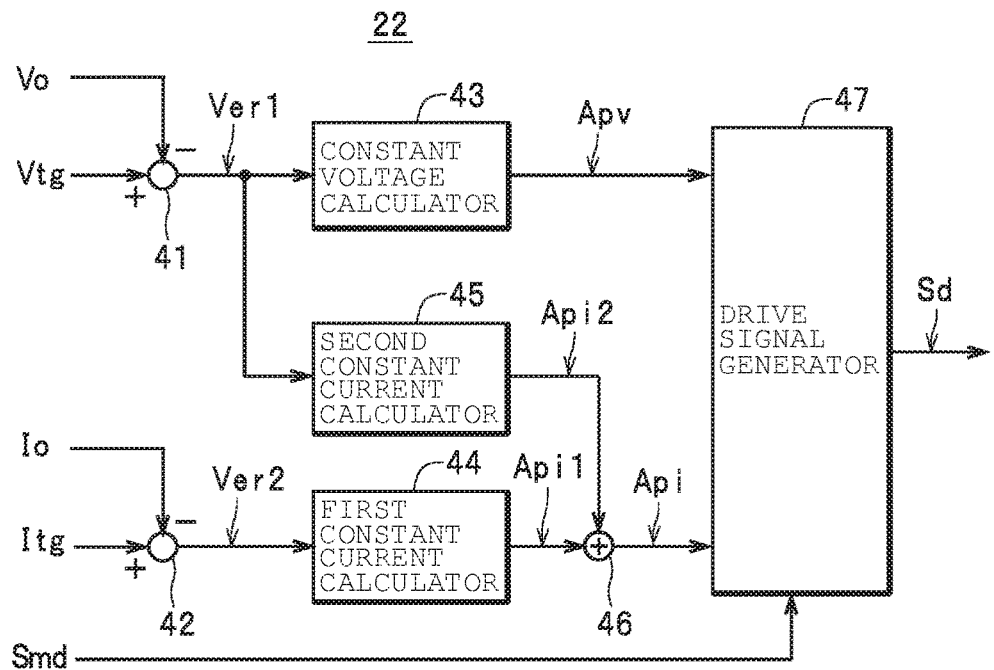
FIG. 2 is a diagram depicting a controller of the power supply.

As one example, as depicted in FIG. 2, the controller 22 includes a first error calculator 41, a second error calculator 42, a constant voltage calculator 43, a first constant current calculator 44, a second constant current calculator 45, an adder 46, and a drive signal generator 47.

In the controller 22, the first error calculator 41 calculates a difference between the voltage value (or "present voltage value") of the DC output voltage Vo indicated by the voltage detection signal Svo and the target voltage value Vtg indicated by the reference voltage Vvr, and outputs a first error signal Ver1 indicating this difference. The second error calculator 42 calculates a difference between the current value (the present current value) of the DC current Io indicated by the current detection signal Sio and the target current value Itg indicated by the reference voltage Vir, and outputs a second error signal Ver2 indicating this difference.

As one example in the present embodiment, the constant voltage calculator 43 is composed of a PID (Proportional-Integral-Differential) calculator, inputs the first error signal Ver1, performs a PID operation on the first error signal Ver1, and outputs a control variable (or "constant-voltage control variable") Apv for a constant-voltage operation (that is, for when a constant-voltage operation is being executed).

As one example in the present embodiment, the first constant current calculator 44 is composed of a PI (Proportional-Integral) calculator, inputs the second error signal Ver2, performs a PI calculation on the second error signal Ver2, and outputs a main control variable (or "first constant-current control variable") Api1 for a constant-current operation. As one example in the present embodiment, the second constant current calculator 45 is composed of a PD (Proportional-Differential) calculator, inputs the first error signal Ver1, performs a PD calculation on the first error signal Ver1, and outputs a sub control variable (or "second constant-current control variable") Api2 for a constant-current operation. The adder 46 functions together with the first constant current calculator 44 and the second constant current calculator 45 to form a constant current calculator as a whole, adds the main control variable Api1 and the sub control variable Api2, and outputs a final control variable (constant current control variable) Api for a constant-current operation.

In other words, the first constant current calculator 44, the second constant current calculator 45, and the adder 46 calculate and output the control variable (the constant current control variable) Api produced by applying (adding) a control variable (the sub control variable Api2) that reflects fluctuations (that is, the difference between the voltage value of the DC output voltage Vo and the target voltage value Vtg) in the voltage across the output. terminals 4a and 4b (that is, the DC output voltage Vo) to the control variable (the main control variable Api1) that reflects the difference between the present current value of the DC current Io and the target current value Itg.

The drive signal generator 47 inputs the constant-voltage control variable Apv, the constant-current control variable Api, and the control signal Smd, and generates and outputs the drive signal Sd for controlling the on-duty of the switching elements 31a for the switch 31 based on the control variable (the constant-voltage control variable Apv during a constant-voltage operation and the constant-current control variable Api during a constant-current operation) corresponding to the operation (constant-voltage operation or constant-current operation) indicated by the control signal Smd.

With the configuration described above, when the control signal Smd outputted from the operation switcher 9 indicates a constant-voltage operation, the controller 22 outputs the drive signal Sd generated based on the constant-voltage control variable Apv to the converter 21 and controls the on-duty of the switching elements 31a, thereby the switching power supply 7 constructed of the converter 21 and the controller 22 executes the constant-voltage operation that sets the present voltage value of the DC output voltage Vo at the target voltage value Vtg. Also, when the control signal Smd outputted from the operation switcher 9 indicates a constant-current operation, the controller 22 outputs the drive signal Sd generated based on the constant-current control variable Api to the converter 21 and controls the on-duty of the switching elements 31a, thereby the switching power supply 7 executes the constant-current operation that sets the present current value of the DC current Io at the target current value Itg.

The indicative voltage generator 8 generates a current indicating voltage whose voltage value changes in proportion to the current value of the DC current IO outputted from the switching power supply unit 7 via the output terminals 4a and 4b to the periphery. In the present embodiment, as described above, since the current detection signal Sio outputted from the switching power supply 7 is a voltage signal whose voltage value (hereinafter, referred to as the "voltage value Vsio" for ease of explanation) changes in proportion to the current value of the DC current Io, the indicative voltage generator 8 uses the current detection signal Sio as this current indicating voltage. The indicative voltage generator 8 also generates a bias voltage Vb of a predetermined voltage value Vb1 which exceeds a predetermined threshold voltage value Vth (that is, Vb1>Vth>0). The indicative voltage generator 8 generates the operation indicating voltage Vcnt by superimposing the bias voltage Vb (with the voltage value Vb1) on the current detection signal Sio (with the voltage value Vsio) as the current indicating voltage. By doing so, the voltage value of the operation indicating voltage Vcnt is set to (Vb1+Vsio).

The indicative voltage generator 8 outputs the operation indicating voltage Vcnt from the master terminal 5 to the periphery. With the power supply 1 according to the present embodiment, when a plurality of power supplies are connected in a master-slave arrangement, as described later, the master terminal 5 of one power supply 1 operated as a master is connected to the slave terminals 6 of all other power supplies 1 operated as slaves. This means that the operation indicating voltage Vcnt is applied as the applied voltage Vslv to the slave terminals 6 of all the other power supplies 1 as slaves. In addition, the power supply 1 is configured so that when the master terminal 5 of another power supply 1 is not connected to the slave terminal 6, the voltage of the slave terminal 6 is set at a voltage value that is below the threshold voltage value Vth (for example, zero volts).

The operation switcher 9 compares the applied voltage value Vslv1 of the applied voltage Vslv that is applied from the periphery to the slave terminal with the threshold voltage value Vth, and when the applied voltage value Vslv1 is equal to or below the threshold voltage value Vth (as described above, when the master terminal 5 of another power supply 1 is not connected to the slave terminal 6, that is, when the power supply 1 is a master), outputs a control signal Smd for indicating a constant-voltage operation (that is, switching to a constant-voltage operation) to (the controller 22 of) the switching power supply 7. On the other hand, when the applied voltage value Vslv1 is above the threshold voltage value Vth (as described above, when the master terminal 5 of another power supply 1 is connected to the slave terminal 6, that is, when the power supply 1 is a slave), the operation switcher 9 outputs a control signal Smd for indicating a constant-current operation (that is, switching to a constant-current operation) to (the controller 22 of) the switching power supply 7.

Figure 3:
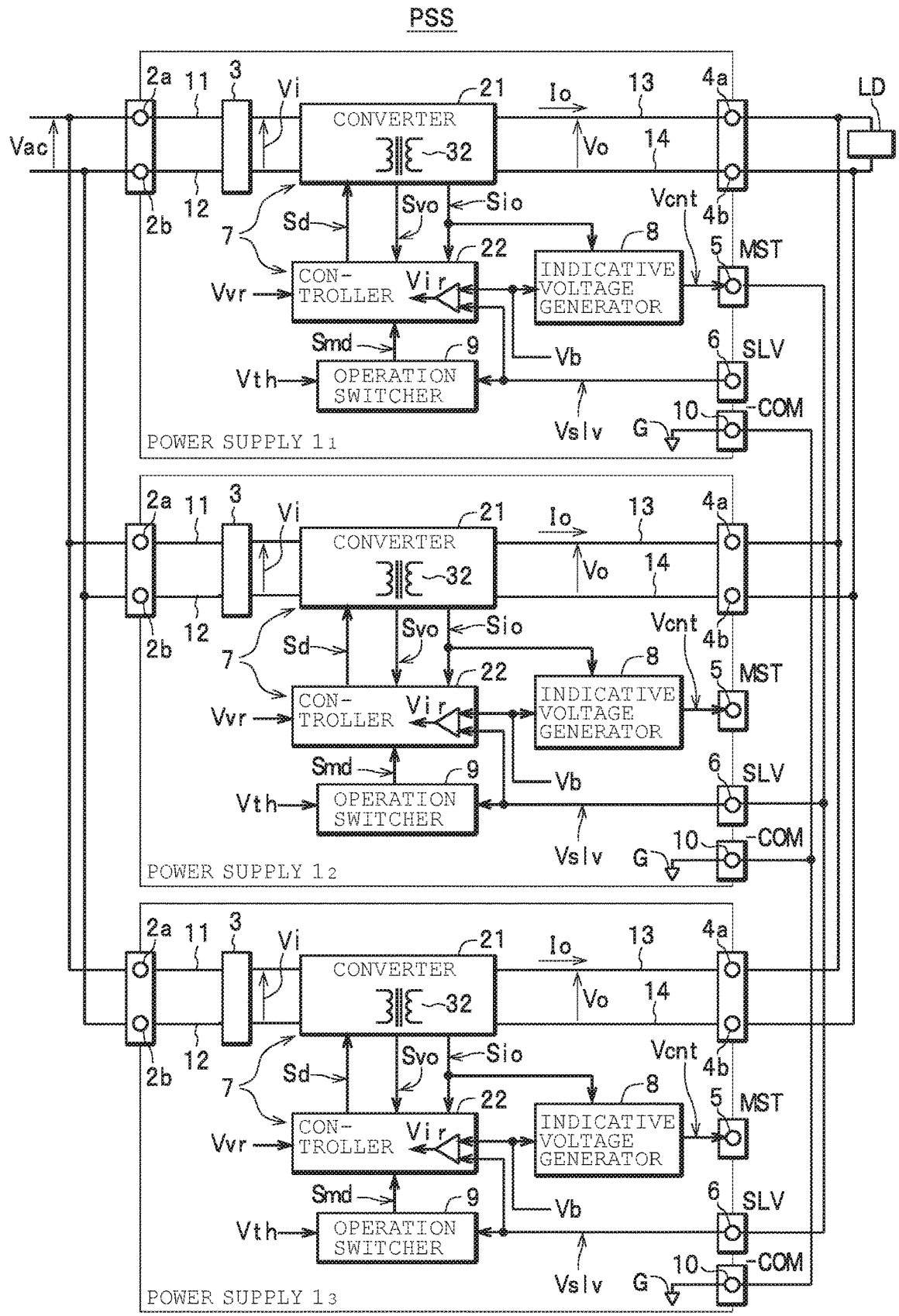
FIG. 3 is a diagram depicting a power supply system constructed by connecting three power supplies in a master-slave arrangement.

Next, as depicted in FIG. 3, an example of a power supply system PSS that has a plurality of the power supplies 1 (in the present embodiment, three power supplies $1_1$, $1_2$, and $1_3$) connected in parallel in a master-slave arrangement to a single load LD to supply power will be used to describe the operation of the power supplies $1_1$, $1_2$, and $1_3$ (hereinafter collectively referred to as the "power supplies 1" when no distinction is made between them).

In the power supply system PSS, the output terminals 4a and 4b of the power supplies $1_1$, $1_2$, and $1_3$ are connected in parallel, one (the power supply $1_1$) out of the power supplies $1_1$, $1_2$ and $1_3$ is set as the master power supply, and the master terminal 5 of the master power supply (the power supply $1_1$) is connected by wires to the slave terminals 6 of all of the remaining power supplies $1_2$ and $1_3$ (the slave power supplies). Note that the slave terminal 6 of the power supply $1_1$ and the master terminals 5 of the power supplies $1_2$ and $1_3$ are left unconnected. The common signal terminals 10 of the power supplies $1_1$, $1_2$ and $1_3$ are connected to each other by wires. By doing so, the ground G of the power supplies $1_1$, $1_2$, and $1_3$ is set at the same potential. Note that although not illustrated, in place of the common signal terminal 10, when the low potential-side output terminal 4b out of the output terminals 4a and 4b is used as the ground of the indicative voltage generator 8, the operation switcher 9, and the like, it is possible to omit the connecting of the common signal terminals 10. The input terminals 2a and 2b of the power supplies $1_1$, $1_2$ and $1_3$ are connected in parallel and the AC input voltage Vac is inputted from a shared input line. It is also assumed that the reference voltages Vvr of the power supplies $1_1$, $1_2$, and $1_3$ (that is, voltages indicating the target voltage value Vtg for the DC output voltage Vo) are all set at the same voltage. The load LD is an electronic appliance (for example, a medical appliance) or the like that operates based on power from the power supplies $1_1$, $1_2$, and $1_3$ (that is, power calculated from the DC output voltage Vo and a total current (3×Io) for the DC currents Io from the power supplies $1_1$, $1_2$, and $1_3$).

When the AC input voltage Vac is inputted from the input terminals 2a and 2b, the primary-side rectifier/smoother 3 of each of the power supplies $1_1$, $1_2$, and $1_3$ rectifies and smoothes the AC input voltage Vac and outputs the DC input voltage Vi to the switching power supply 7.

Here, at the power supply $1_1$ that functions as the master, since the slave terminal 6 is unconnected and no voltage is applied from the periphery, the applied voltage Vslv (with the voltage value Vslv1) is a voltage value (in the present embodiment, zero volts) that is below the threshold voltage value Vth. The operation switcher 9 compares the applied voltage value Vslv1 (zero volts) of the applied voltage Vslv with the threshold voltage value Vth (>0) and since the applied voltage value Vslv1 is equal to or below the threshold voltage value Vth, outputs a control signal Smd for indicating the constant-voltage operation to the switching power supply 7.

Since the control signal Smd outputted from the operation switcher 9 indicates the constant-voltage operation, the controller 22 of the switching power supply 7 outputs a drive signal Sd generated based on the constant-voltage control variable Apv to the converter 21 and controls the on-duty of the switching elements 31a to execute a constant-voltage operation that sets the present voltage value of the DC output voltage Vo at the target voltage value Vtg. In a constant-voltage operation, when the present voltage value of the DC output voltage Vo falls below the target voltage value Vtg due for example to fluctuations in the load LD, the switching power supply 7 executes control that increases the on-duty of the switching elements 31a to increase the current value of the DC current Io and restore the present voltage value of the DC output voltage Vo to the target voltage value Vtg. On the other hand, when the present voltage value of the DC output voltage Vo exceeds the target voltage value Vtg, the switching power supply 7 executes control that decreases the on-duty of the switching elements 31a to decrease the current value of the DC current Io and restore the present voltage value of the DC output voltage Vo to the target voltage value Vtg.

The indicative voltage generator 8 uses the current detection signal Sio (that is, a signal whose voltage value changes in proportion to the current value of the DC current Io) outputted from the converter 21 of the switching power supply 7 as the current indicating voltage, and superimposes the bias voltage Vb (with a voltage value Vb1) on the current detection signal Sio (with the voltage value Vsio) to generate the operation indicating voltage Vcnt (with the voltage value Vb1+Vsio) that is outputted to the master terminal 5. By doing so, the operation indicating voltage Vcnt (with the voltage value Vb1+Vsio) is applied to the slave terminals 6 of the other power supplies $1_2$ and $1_3$ connected by wiring to the master terminal 5.

At the other power supplies $1_2$ and $1_3$ the operation indicating voltage Vcnt (with the voltage value Vb1+Vsio) is applied to the slave terminals 6 as the applied voltage Vslv (with the voltage value Vslv1=Vb1+Vsio). Here, since the voltage value Vb1 of the bias voltage Vb exceeds the threshold voltage value Vth, the applied voltage Vslv also has a voltage value that exceeds the threshold voltage value Vth. The operation switcher 9 compares the applied voltage value Vslv1 of the applied voltage Vslv and the threshold voltage value Vth and since the applied voltage value Vslv1 exceeds the threshold voltage value Vth, outputs the control signal Smd for indicating the constant-current operation to the switching power supply.

Since the control signal Smd outputted from the operation switcher 9 indicates the constant-current operation, the controller 22 of the switching power supply 7 outputs a drive signal Sd generated based on the constant-current control variable Api to the converter 21 to control the on-duty of the switching elements 31a and thereby execute a constant-current operation that sets the present current value of the DC current Io at the target current value Itg.

As described above, the constant-current control variable Api is a control variable calculated by applying (adding) a control variable (the sub control variable Api2) that reflects fluctuations (that is, the difference between the voltage value of the DC output voltage Vo and the target voltage value Vtg) in the DC output voltage Vo to a control variable (the main control variable Api1) that reflects the difference between the present current value of the DC current to and the target current value Itg.

Here, in a normal state where the voltage value (or "present voltage value") of the DC output voltage Vo outputted from the power supplies $1_1$, $1_2$ and $1_3$ connected in parallel to the load LD is being kept at the target voltage value Vtg, the first error signal Ver1 outputted from the first error calculator 41 is zero and for this reason, the sub control variable Api2 outputted by the second constant current calculator 45 is also zero. Accordingly, the constant-current control variable Api is a control variable (the main control variable Api1) in keeping with only the difference between the present current value of the DC current Io and the target current value Itg.

Since the main control variable Api1 is a control variable calculated and outputted by the first constant current calculator 44 based on the second error signal Ver2 outputted from the second error calculator 42 (that is, the difference between the current value (the present current value) of the DC current Io indicated by the current detection signal Sio and the target current value Itg indicated by the reference voltage Vir), the main control variable Api1 is a control variable for setting the current value (the present current value) of the DC current Io at the target current value Itg indicated by the reference voltage Vir. Since the reference voltage Vir is a voltage calculated by subtracting the bias voltage Vb (with the voltage value Vb1) from the applied voltage Vslv (with the voltage value Vslv1) applied to the slave terminal 6 and the applied voltage Vslv (with the voltage value Vslv1) is the operation indicating voltage Vcnt (with the voltage value Vb1+Vsio), the voltage value of the reference voltage Vir the voltage value Vsio, that is, a voltage value that indicates the present current value of the DC current Io at the power supply $1_1$.

By doing so, during a normal state where the voltage value (the present voltage value) of the DC output voltage Vo outputted from the power supplies $1_1$, $1_2$, and $1_3$ is stable at the target voltage value Vtg, at the power supplies $1_2$ and $1_3$, the controller 22 of the switching power supply 7 outputs a drive signal Sd generated based on the constant-current control variable Api composed of only the main control variable Api1 to the converter 21 to control the on-duty of the switching elements 31a and thereby execute a constant-current operation where the present current value of the DC current Io is set at the target current value Itg indicated by the reference voltage Vir (that is, the present current value of the DC current to at the power supply $1_1$). Accordingly, the present current values of the DC currents Io outputted from the power supplies $1_2$ and $1_3$ are kept equal to the present current value of the DC current Io at the power supply $1_1$, so that power with the DC output voltage Vo at the target voltage value Vtg and a DC current (3×Io) whose current value is three times the present current value of the DC current Io at the power supply $1_1$ is supplied to the load LD.

On the other hand, in a state where the voltage value (the present voltage value) of the DC output voltage Vo outputted from the power supplies $1_1$, $1_2$, and $1_3$ has fluctuated from the target voltage value Vtg, the first error signal Ver1 outputted from the first error calculator 41 becomes a voltage value (≠zero volts) in keeping with the difference between the voltage value (the present voltage value) of the DC output voltage Vo and the target voltage value Vtg, and due to this, the sub control variable Api2 outputted by the second constant current calculator 45 also becomes a control variable (≠zero) in keeping with the difference between the voltage value (the present voltage value) of the DC output voltage Vo and the target voltage value Vtg. Accordingly, the constant-current control variable Api is a control variable calculated by adding the sub control variable Api2 to a control variable (the main control variable Api1) in keeping with the difference between the present current value of the DC current to and the target current value Itg, that is, a control variable produced by applying (adding) a control variable (the sub control variable Api2) that reflects fluctuations in the DC output voltage Vo (that is, the difference between the voltage value of the DC output voltage Vo and the target voltage value Vtg) to a control variable (the main control variable Api1) that reflects the difference between the present current value of the DC current Io and the target current value Itg.

As described above, this main control variable Api1 is a control variable for setting the current value (the present current value) of the DC current Io at the target current value Itg indicated by the reference voltage Vir (the present current value of the DC current Io at the power supply $1_1$). Also, as described above, with the power supply $1_1$, the switching power supply 7 executes a constant-voltage operation, whereby the current value of the DC current Io is increased when the present voltage value of the DC output voltage Vo has fallen below the target voltage value Vtg due for example to a fluctuation in the load LD, or the current value of the DC current Io is decreased when the present voltage value of the DC output voltage Vo has exceeded the target voltage value Vtg due for example to a fluctuation in the load LD, to thereby restore the present voltage value of the DC output voltage Vo to the target voltage value Vt. This means that even with a configuration where the switching power supplies 7 of the power supplies $1_2$ and $1_3$ execute a constant-current operation where the sub control variable Api2 is not applied (added) to the main control variable Api1 that constructs the constant-current control variable Api (that is, a constant-current operation based on the constant-current control variable Api composed of only the main control variable Api1), since it is possible for the power supplies $1_2$ and $1_3$ to operate in concert with the power supply $1_1$ to increase or decrease the current value of the respective DC currents Io, it is possible for these power supplies to operate in concert with the power supply $1_1$ and keep the present voltage value of the DC output voltage Vo at the target voltage value Vtg.

However, the power supply 1 according to the present embodiment uses a configuration where the first error signal Ver1 (a signal indicating the difference between the voltage value (the present voltage value) of the DC output voltage Vo and the target voltage value Vtg) from the first error calculator 41 that is used in the constant-voltage operation is calculated at the second constant current calculator 45 as the sub control variable (or "second constant-current control variable") Api2 for a constant-current operation and is added (applied) to the main control variable Api1 to generate the constant-current control variable Api. Accordingly, at the power supplies $1_2$ and $1_3$, the switching power supplies 7 are capable of starting an operation based on the sub control variable Api2 (that is, an operation that detects fluctuations with respect to the target voltage value Vtg in the present voltage value of the DC output voltage Vo of that power supply 1 and increases or decreases the current value of the DC current Io of that power supply 1 in keeping with the detected fluctuations) ahead of an operation based on the main control variable Api1 (an operation that increases or decreases the current value of the DC current Io of that power supply 1 in concert with the power supply $1_1$). By doing so, even when the present voltage value of the DC output voltage Vo has suddenly fluctuated, the power supplies $1_2$ and $1_3$ are capable of increasing and decreasing the current value of the DC current Io outputted from that power supply 1 so as to favorably follow the sudden fluctuations, which means that the power supplies $1_1$, $1_2$, and $1_3$ as a whole are capable of restoring the present voltage value of the DC output voltage Vo to the target voltage value Vtg in a short time and maintaining the target voltage value Vtg thereafter.

By operating in this way, even when the power value of the power required at the load LD suddenly falls (that is, when the load becomes lighter) or suddenly rises (that is, when the load becomes heavier) from the normal power value, the power supplies $1_1$, $1_2$, and $1_3$ that are connected in a master-slave arrangement are capable as a whole of generating power with a DC output voltage Vo at the target voltage value Vtg and respective DC currents Io whose current value is ⅓ of the current value required by the load LD and supplying (outputting) this power to the load LD.

In this way, with the power supply 1, it is possible to connect a plurality of power supplies (in the example described above, the three power supplies $1_1$, $1_2$, and $1_3$) in a master-slave arrangement to construct a power supply system PSS. As the connecting tasks (wiring tasks) when power is to be supplied (outputted) to a common load LD, it is sufficient, as connection tasks aside from a task or connecting the input terminals 2a and 2b of the power supplies $1_1$, $1_2$, and $1_3$ to an input line and a task of connecting the output terminals 4a and 4b of the power supplies $1_1$, $1_2$, and $1_3$ to the load LD (that is, as connection tasks required to produce the master-slave arrangement), to merely perform a task of connecting the common signal terminals 10 of the power supplies $1_1$, $1_2$, and $1_3$ together and a task of connecting the master terminal 5 of the power supply (the power supply $1_1$) set as the master to the slave terminals 6 of the remaining power supplies $1_2$ and $1_3$ (the slave power supplies) with wires.

Accordingly, by using the power supply 1, compared to a case where the conventional power supplies described above are connected in a master-slave arrangement to construct a power supply system (where the connecting tasks required to produce a master-slave arrangement include connecting tasks of connecting the current balance terminals CB together and the common signal terminals –COM together for all the power supplies and connecting the reference output voltage terminal REF of the power supply set as the master to the variable output voltage terminals RV of all of the power supplies), it is possible to complete the connecting tasks to produce the master-slave arrangement and thereby construct the power supply system PSS with fewer wires. This means that according to the power supply 1, it is possible to reduce the burden of connecting tasks for constructing the power supply system PSS (that is, it is possible to reduce the time required by connecting tasks).

Also, with the power supply 1, when executing a constant-current operation, the switching power supply 7 calculates the final control variable (the control variable Api) for a constant-current operation by applying (adding) a control variable (the sub control variable Api2) that reflects fluctuations in the voltage (the DC output voltage Vo) at the output terminals 4a and 4b of that power supply 1 to a control variable (the main control variable Api1) that reflects the difference between the present current value of the DC current Io outputted by that power supply 1 and the target current value Itg and controls the on-duty of the switching elements 31a based on this calculated control variable Api.

This means that with the power supply 1, at a power supply 1 operating as a slave (in the example described above, the power supplies 1₂ and 1₃ that execute a constant-current operation), the switching power supply 7 is capable of starting an operation based on the sub control variable Api2 (that is, an operation that detects fluctuations with respect to the target voltage value Vtg in the present voltage value of the DC output voltage Vo of that power supply 1 and increases or decreases the current value of the DC current Io of that power supply 1 in keeping with the detected fluctuations) ahead of an operation based on the main control variable Api1 (an operation that increases or decreases the current value of the DC current Io of an individual power supply 1 in concert with the power supply 1₁). By doing so, even when the present voltage value of the DC output voltage Vo has suddenly fluctuated, a power supply 1 that operates as a slave (the power supplies 1₂ and 1₃) is capable of increasing and decreasing the current value of the DC current Io outputted from that power supply 1 so as to favorably follow the sudden fluctuations, which means that the plurality of power supplies 1 connected in the master-slave arrangement are capable as a whole of restoring the present voltage value of the DC output voltage Vo to the target voltage value Vtg in a short time and maintaining the target voltage value Vtg thereafter.

Note that when sudden fluctuations do not occur for the load LD, there are cases where a power supply 1 operating as a slave may use a control variable (the main control variable Api1) that reflects the difference between the present current value of the DC current Io of that power supply 1 as a slave and the target current value Itg (that is, the present current value of the DC current Io of the power supply 1 as a master indicated by the voltage value Vsio included in the operation indicating voltage Vcnt applied from the power supply 1 as the master to the slave terminal 6) as the final control variable Api for a constant-current operation. In such cases, in the configuration of the controller 22 depicted in FIG. 2, the second constant current calculator 45 and the adder 46 may be omitted to produce a configuration that sets only the main control variable Api1 outputted by the first constant current calculator 44 as the control variable Api.

In this way, a power supply system with the power supply 1 that is configured so that a plurality of power supplies 1 can be connected in parallel in a master-slave arrangement and supply power to a single load LD (in the example described above, the power supply system PSS composed of the three power supplies 1₁, 1₂ and 1₃) is capable of being used in a medical system where the load LD is a medical appliance.

A medical system MES1 equipped with the power supply system PSS will now be described with reference to FIG. 4 for an example configuration equipped with a power supply system PSS composed of the three power supplies 1₁, 1₂, and 1₃ as depicted in FIG. 3. Note that it is assumed here that the isolation transformer 32 of each of the power supplies 1 (the power supplies 1₁, 1₂, and 1₃ in FIG. 4) is sufficiently isolated to meet medical standards (that is, the isolation transformers 32 have reinforced insulation). It is further assumed that a medical appliance is connected as the load LD and that an FG line for grounding is connected to a housing H of each power supply 1. Note also that the controller 22, the indicative voltage generator 8, and the operation switcher 9 of each power supply 1 have been omitted from the drawings and the configuration for connecting the common signal terminals 10 of the power supplies 1 together has also been omitted from the drawings.

In this system, each power supply 1 operates by inputting the AC input voltage Vac as an input voltage supplied across input lines (an L-phase line and an N-phase line) via the pair of input terminals 2a and 2b. To do so, as described above, the power supply 1 internally includes the primary-side rectifier/smoother 3 connected via the pair of power supply lines 11 and 12 to the pair of input terminals 2a and 2b, and is configured so that the primary-side rectifier/smoother 3 rectifies and smoothes the AC input voltage Vac inputted via the input lines L and N, the pair of input terminals 2a and 2b, and the pair of power supply lines 11 and 12 to generate the DC input voltage Vi, which is outputted to the converter 21 of the switching power supply 7. The power supply 1 also internally includes a fuse 71 (or a breaker) that is interposed on the pair of power supply lines 11 and 12.

According to the medical system MES1 equipped with the power supply system PSS (a power supply system composed of a plurality of power supplies 1 connected in parallel in a master-slave arrangement), each power supply 1 is equipped with the isolation transformer 32 that has reinforced insulation and the fuse 71 as described above and is configured so as to be capable of meeting medical standards by itself. This means that it is possible to realize a configuration capable of meeting medical standards without an isolation transformer and a fuse (or a breaker) being provided outside each power supply 1 (in more detail, on the input lines (the L-phase line and N-phase line) connected to the power supply 1). Also, according to the medical system MES1, by including the power supply system PSS, it is possible to achieve the same effects as when the power supply system PSS is constructed using the power supply 1 described above.

Also, although in the medical system MES1 described above, each power supply 1 internally includes the fuse 71 (or the breaker), it is also possible to configure a medical system using power supplies 1 that do not internally include the fuse 71 (or the breaker). A medical system MES2 that uses this configuration will now be described with reference to FIG. 5. Note that configurations that are the same as the medical system MES1 described above have been assigned the same reference numerals and duplicated description is omitted, with the following description instead focusing on configurations that differ to the medical system MES1.

Figure 5:
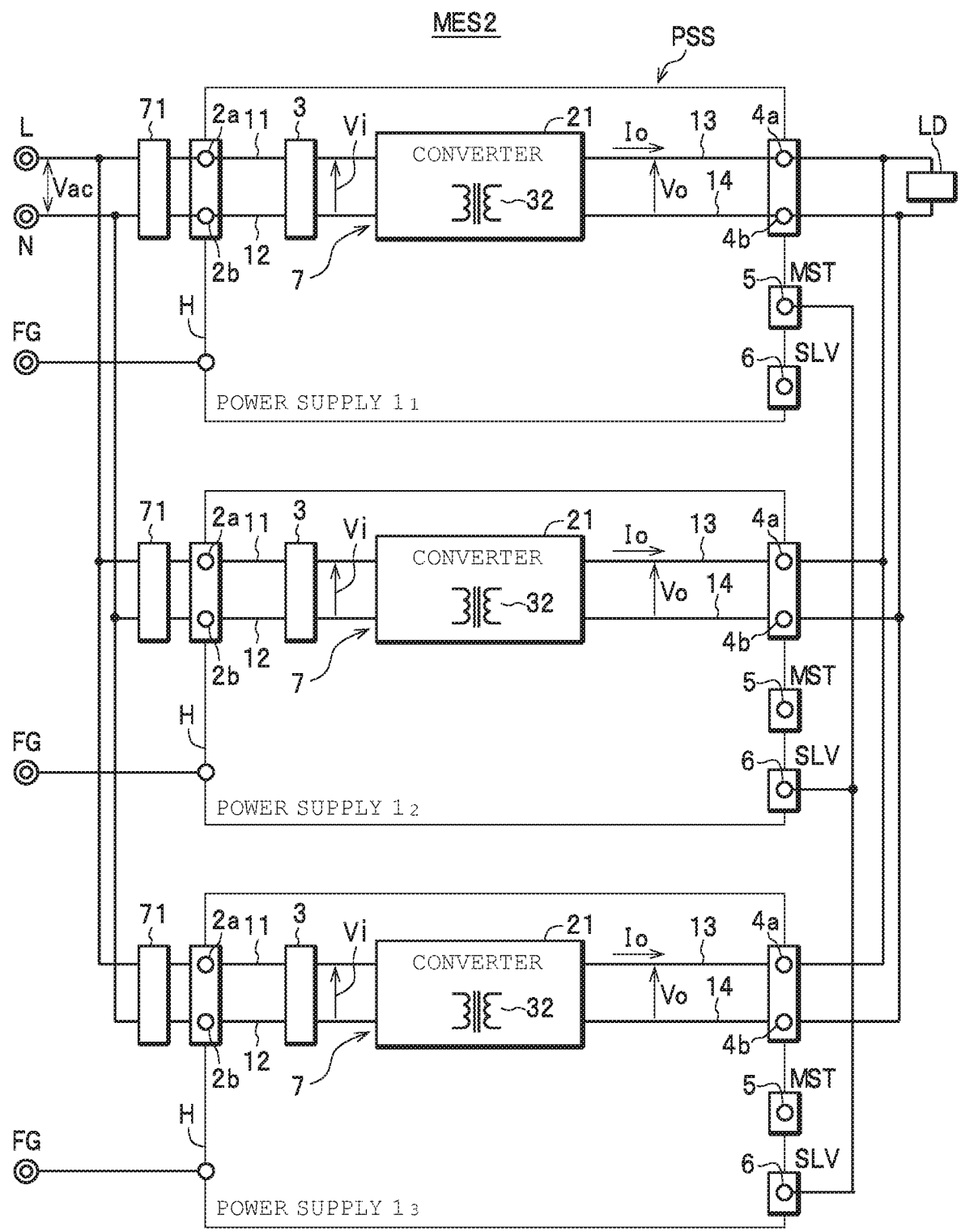
FIG. 5 is a diagram of another medical system equipped with a power supply system composed of three power supplies.

As depicted in FIG. 5, in this medical system MES2, the fuse 71 (or the breaker) is interposed on the input lines (the L-phase line and the N-phase line) connected to the input terminals 2a and 2b of each power supply 1. With this configuration, the AC input voltage Vac supplied across the input lines (the L-phase line and the N-phase line) is inputted into the input terminals 2a and 2b of each power supply 1 via the fuse 71 (or the breaker) provided for each power supply 1.

According to the medical system MES2 equipped with the power supply system PSS (a power supply system constructed by connecting a plurality of power supplies 1 in parallel in a master-slave arrangement), since each power supply 1 includes the isolation transformer 32 that has reinforced insulation as described above, it is possible to realize a configuration capable of meeting medical standards by merely interposing the fuse 71 (or the breaker) outside each power supply 1 (in more detail, on the input lines (the L-phase line and N-phase line) connected to each power supply 1). Also, according to the medical system MES2, by including the power supply system PSS, it is possible to achieve the same effects as when the power supply system PSS is constructed using the power supply 1 described above.

Figure 6:
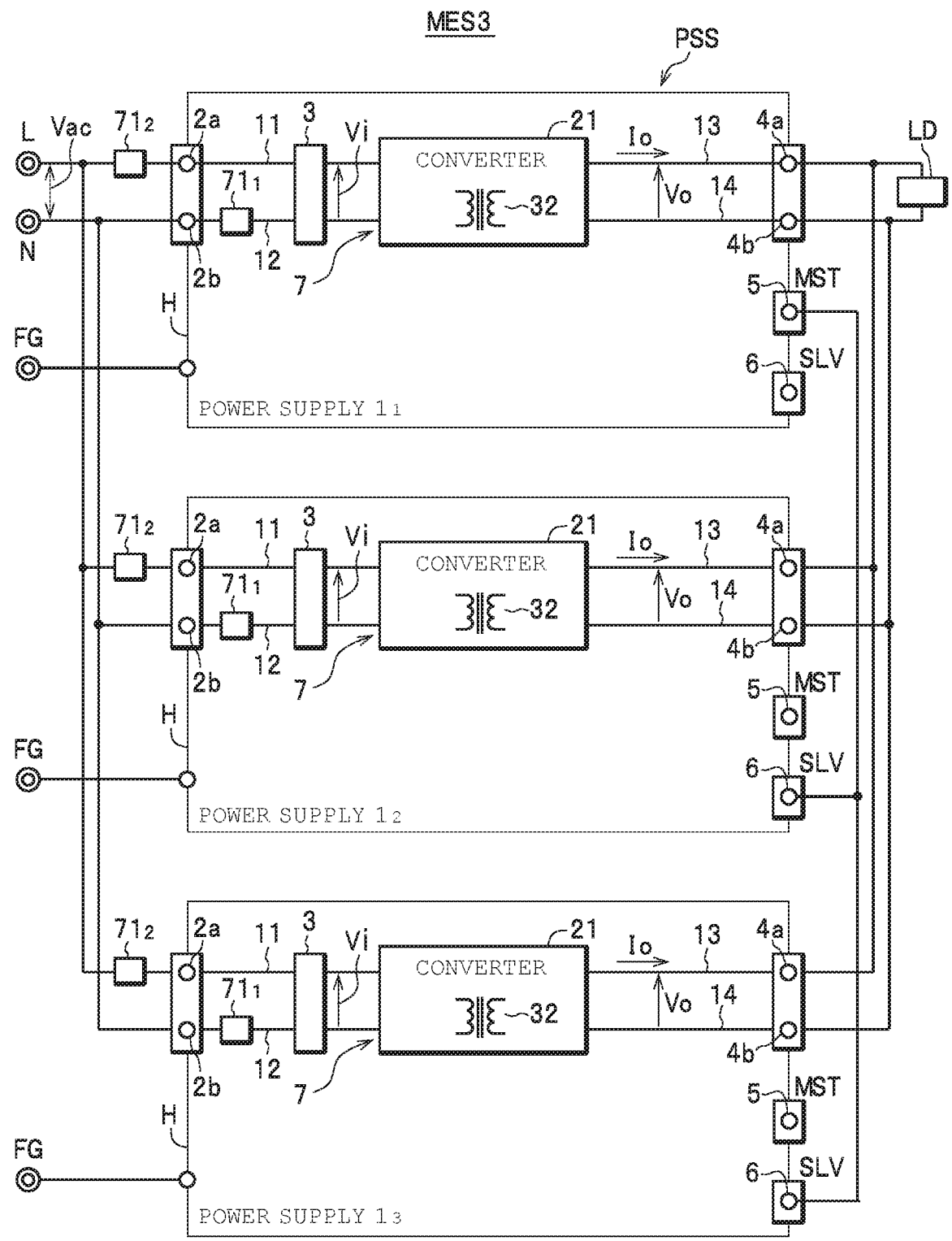
FIG. 6 is a diagram of another medical system equipped with a power supply system composed of three power supplies.
Figure 7:
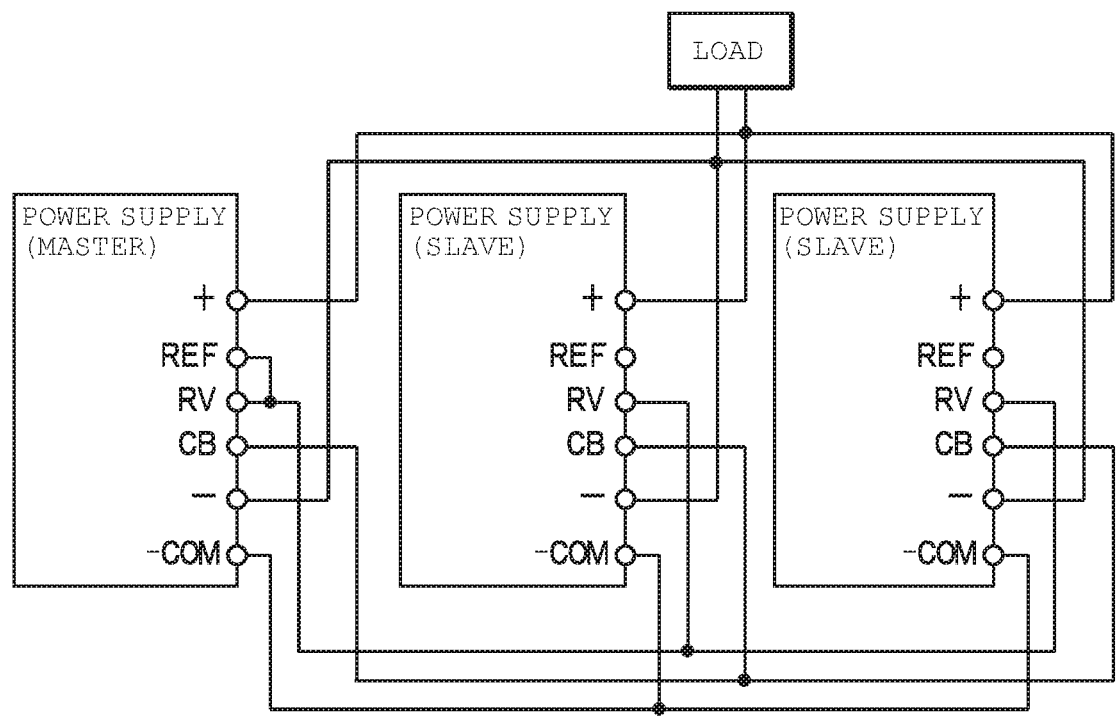
FIG. 7 is a diagram of a power supply system composed of three conventional power supplies connected in a master-slave arrangement.

Although the medical systems MES1 and MES2 described above are configured with the fuse 71 (or the breaker) interposed only one of inside and outside each power supply 1, it is also possible to use a configuration where a fuse 71 (or a breaker) is interposed both inside and outside each power supply 1. A medical system MES3 that uses this configuration will now be described with reference to FIG. 6. Note that configurations that are the same as the medical systems MES1 and MES2 described above have been assigned the same reference numerals and duplicated description is omitted, with the following description instead focusing on configurations that differ to the medical systems MES1 and MES2.

In the medical system MES3, each power supply 1 internally includes a fuse $71_1$ as a first fuse (or a breaker as a first breaker) that is interposed on one power supply line (as one example in the present embodiment, the power supply line 12) out of the pair of power supply lines 11 and 12. Additionally, a fuse $71_2$ as a second fuse (or a breaker as a second breaker) is disposed outside each power supply 1 in a state where the fuse $71_2$ is interposed on an input line (in the present embodiment, the L-phase line) connected via an input terminal (in the present embodiment, the input terminal 2a) to the other power supply line (as one example in the present embodiment, the power supply line 11) out of the pair of power supply lines 11 and 12. Note that although not illustrated, it is also possible to use a configuration where the fuse $71_1$ as the first fuse (or a breaker as the first breaker) is interposed on the power supply line 11 and corresponding to this, the fuse $71_2$ as the second fuse (or a breaker as the second breaker) as interposed on the N-phase line.

According to the medical system MES3 equipped with the power supply system PSS (a power supply system constructed by connecting a plurality of power supplies 1 in parallel in a master-slave arrangement), since each power supply 1 internally includes the isolation transformer 32 that has reinforced insulation as described above and the fuse $71_1$ (or a breaker) interposed on one power supply line (the power supply line 11 or the power supply line 12), by merely interposing the other fuse $71_2$ (or a breaker) outside each power supply 1 (in more detail, on the input line (the L-phase line or the N-phase line) connected to the other power supply line out of the input lines (the L-phase line and the N-phase line) connected to each power supply 1), it is possible to realize a configuration capable of meeting medical standards. Also, according to the medical system MES3, by including the power supply system PSS, it is possible to achieve the same effects as when the power supply system PSS is constructed of the power supply 1 described above.

What is claimed is:

1. A power supply comprising:
    a pair of input terminals into which an input voltage is inputted;
    a pair of output terminals;
    a master terminal;
    a slave terminal;
    a switching power supply that includes a switch that swatches a direct current (DC) input voltage, which has been generated based on the input voltage, and is configured to switch between and execute a constant-voltage operation that generates a DC voltage of a set target voltage value based on the input voltage and outputs to the output terminals and a constant-current operation that generates a DC current of a set target current value based on the input voltage and outputs to the output terminals;
    an indicative voltage generator that generates a current indicating voltage whose voltage value changes in proportion to a current value of a current outputted from the switching power supply to a periphery via the output terminals, superimposes a bias voltage with a predetermined voltage value, which exceeds a predetermined voltage threshold value, onto the current indicating voltage, and outputs from the master terminal to the periphery as an operation indicating voltage; and
    an operation switcher that compares an applied voltage value of an applied voltage, which is applied from the periphery to the slave terminal, and the threshold voltage value, outputs a control signal for switching to the constant-voltage operation to the switching power supply when the applied voltage value is below the threshold voltage value, and outputs a control signal for switching to the constant-current operation, which sets a current value in proportion to a difference in voltage value between the applied voltage value and the bias voltage as the set target current value, to the switching power supply when the applied voltage value is above the threshold voltage value.

2. The power supply according to claim 1:
    wherein in an execution state of the constant-current operation, the switching power supply calculates a control variable by applying a control variable, which reflects fluctuations in a voltage of the output terminals, to a control variable that reflects a difference between a present current value of the DC current and the set target current value, and controls an on-duty of the switch based on the calculated control variable.

3. A medical system comprising:
    a plurality of power supplies according to claim 1 that each further include: a primary-side rectifier/smoother that is connected via a pair of power supply lines to the pair of input terminals and rectifies and smoothes an alternating current (AC) input voltage, which is inputted as the input voltage via the pair of input terminals and the pair of power supply lines, from an input line connected to the pair of input terminals, and outputs as the DC input voltage to the switching power supply; and a fuse or a breaker interposed on the pair of power supply lines, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply; and a medical appliance that is connected to the output terminals that are connected in parallel and operates based on the DC voltage from the power supplies.

4. A medical system comprising:

a plurality of power supplies according to claim 2 that each further include: a primary-side rectifier/smoother that is connected via a pair of power supply lines to the pair of input terminals and rectifies and smoothes an alternating current (AC) input voltage, which is inputted as the input voltage via the pair of input terminals and the pair of power supply lines, from an input line connected to the pair of input terminals, and outputs as the DC input voltage to the switching power supply; and a fuse or a breaker interposed on the pair of power supply lines, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply; and a medical appliance that is connected to the output terminals that are connected in parallel and operates based on the DC voltage from the power supplies.

5. A medical system comprising:

a plurality of power supplies according to claim 1 that each further include a primary-side rectifier/smoother that is connected via a pair of power supply lines to the pair of input terminals and rectifies and smoothes an AC input voltage, which is inputted as the input voltage via the pair of input terminals and the pair of power supply lines, from an input line connected to the pair of input terminals, and outputs as the DC input voltage to the switching power supply, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply;

a fuse or a breaker interposed on the input line; and a medical appliance that is connected to the output terminals that are connected in parallel and operates based on the DC voltage from the power supplies.

6. A medical system comprising:

a plurality of power supplies according to claim 2 that each further include a primary-side rectifier/smoother that is connected via a pair of power supply lines to the pair of input terminals and rectifies and smoothes an AC input voltage, which is inputted as the input voltage via the pair of input terminals and the pair of power supply lines, from an input line connected to the pair of input terminals, and outputs as the DC input voltage to the switching power supply, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply;

a fuse or a breaker interposed on the input line; and a medical appliance that is connected to the output terminals that are connected in parallel and operates based on the DC voltage from the power supplies.

7. A medical system comprising:

a plurality of power supplies according to claim 1 that each further include: a primary-side rectifier/smoother that is connected via a pair of power supply lines to the pair of input terminals and rectifies and smoothes an AC input voltage, which is inputted as the input voltage via the pair of input terminals and the pair of power supply lines, from an input line connected to the pair of input terminals, and outputs as the DC input voltage to the switching power supply; and a first fuse or a first breaker interposed on one power supply line out of the pair of power supply lines, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply;

a second fuse or a second breaker interposed on the input line connected via the input terminal to another power supply, line out of the pair of power supply lines; and a medical appliance that is connected to the output terminals that are connected in parallel and operates based on the DC voltage from the power supplies.

8. A medical system comprising:

a plurality of power supplies according to claim 2 that each further include: a primary-side rectifier/smoother that is connected via a pair of power supply lines to the pair of input terminals and rectifies and smoothes an AC input voltage, which is inputted as the input voltage via the pair of input terminals and the pair of power supply lines, from an input line connected to the pair of input terminals, and outputs as the DC, input voltage to the switching power supply; and a first fuse or a first breaker interposed on one power supply line out of the pair of power supply lines, and are each configured with the switching power supply as an isolation converter that includes an isolation transformer, wherein the output terminals of the plurality of power supplies are connected in parallel and one power supply out of the plurality of power supplies is set as a master power supply and the master terminal of the master power supply is connected to the slave terminals of every remaining power supply;

a second fuse or a second breaker interposed on the input line connected via the input terminal to another power supply line out of the pair of power supply lines; and a medical appliance that is connected to the output terminals that are connected in parallel and operates based on the DC voltage from the power supplies.

* * * * *